United States Patent
Fieglein et al.

(10) Patent No.: US 11,790,335 B2
(45) Date of Patent: Oct. 17, 2023

(54) FUEL DISPENSER WIRED COMMUNICATION

(71) Applicant: Wayne Fueling Systems LLC, Austin, TX (US)

(72) Inventors: Henry Fieglein, Cedar Park, TX (US); Richard Carlsson, Malmo (SE)

(73) Assignee: Wayne Fueling Systems LLC, Austin, TX (US)

( * ) Notice: Subject to any disclaimer, the term of this patent is extended or adjusted under 35 U.S.C. 154(b) by 1436 days.

(21) Appl. No.: 15/207,018

(22) Filed: Jul. 11, 2016

(65) Prior Publication Data

US 2018/0012205 A1 Jan. 11, 2018

(51) Int. Cl.
| | |
|---|---|
| *G06Q 40/00* | (2023.01) |
| *G06Q 20/10* | (2012.01) |
| *G07F 13/02* | (2006.01) |
| *B67D 7/04* | (2010.01) |
| *B67D 7/14* | (2010.01) |

(52) U.S. Cl.
CPC ............ *G06Q 20/102* (2013.01); *B67D 7/04* (2013.01); *B67D 7/145* (2013.01); *G07F 13/025* (2013.01)

(58) Field of Classification Search
CPC ........ G06Q 20/102; B67D 7/04; B67D 7/145; G07F 13/025
See application file for complete search history.

(56) References Cited

U.S. PATENT DOCUMENTS

| | | | | |
|---|---|---|---|---|
| 5,602,745 | A * | 2/1997 | Atchley | B67D 7/222 |
| | | | | 705/413 |
| 6,360,138 | B1 | 3/2002 | Coppola et al. | |
| 6,442,448 | B1 * | 8/2002 | Finley | B67D 7/145 |
| | | | | 700/231 |
| 9,340,405 | B2 * | 5/2016 | Barker, Jr. | B67D 7/04 |
| 9,972,159 | B2 * | 5/2018 | Carapelli | G06Q 20/18 |
| 2007/0265733 | A1 | 11/2007 | Harrell | |
| 2009/0129403 | A1 * | 5/2009 | Harrell | G07F 13/02 |
| | | | | 370/467 |

(Continued)

FOREIGN PATENT DOCUMENTS

| | | | |
|---|---|---|---|
| KR | 20060024920 A | 3/2006 | |
| WO | WO-0075065 A2 * | 12/2000 | ............. B67D 7/145 |

OTHER PUBLICATIONS

Patton Technology Solves ROI Challenge of EMV Compliance for US Fuel Retailers. Business Wire. Mar. 3, 2016.

(Continued)

*Primary Examiner* — Abhishek Vyas
*Assistant Examiner* — William B. Bunker
(74) *Attorney, Agent, or Firm* — MINTZ LEVIN COHN FERRIS GLOVSKY AND POPEO, PC

(57) ABSTRACT

Various methods, systems, and device are provided for facilitating communication between a fuel dispenser and a forecourt controller. In some embodiments, the methods, systems, and devices allow data to be combined and compressed for transmission through a reduced number of data connections, and then decompressed for transmission to the forecourt controller or components of the fuel dispenser. In certain exemplary embodiments, the compressing and decompressing can be performed by one or more signal combiners at the forecourt controller and the fuel dispenser.

20 Claims, 7 Drawing Sheets

(56) References Cited

U.S. PATENT DOCUMENTS

| | | | |
|---|---|---|---|
| 2011/0022223 A1* | 1/2011 | Johnson, Jr. | G06Q 20/20 700/232 |
| 2013/0121428 A1* | 5/2013 | Carapelli | H04B 3/54 375/257 |
| 2013/0198058 A1* | 8/2013 | Barker, Jr. | G06Q 20/18 705/39 |
| 2014/0114473 A1* | 4/2014 | McNinch | G06F 1/26 700/241 |
| 2015/0105920 A1* | 4/2015 | Carapelli | G07F 9/001 700/283 |
| 2015/0242969 A1* | 8/2015 | Pallas | G06Q 50/06 705/39 |
| 2016/0182144 A1* | 6/2016 | Stout | H01Q 13/06 455/66.1 |

OTHER PUBLICATIONS

International Search Report and Written Opinion for Application No. PCT/US2017/041314 dated Oct. 20, 2017.

U.S. Appl. No. 15/206,951 entitled "Fuel Dispenser Communication" filed Jul. 11, 2016.

\* cited by examiner

FUEL DISPENSER WIRED COMMUNICATION

FIELD

The present disclosure relates generally to fuel dispenser wired communication.

BACKGROUND

In a gas station environment, a fuel dispenser is typically located in the forecourt, and it is in communication with a forecourt controller located within or around a building, such as a store. The forecourt controller is connected to a point-of-sale (POS) system, that receives user input. Certain existing fuel dispensers are coupled to the forecourt controller by only two wires that run underground from the fuel dispenser to the building. These two wires are used for transmitting payment commands and fueling commands to the dispenser. However, some fuel dispensers can contain, or be modified to contain, a payment terminal that conforms to EUROPAY, MASTERCARD, and VISA (EMV) standards. Data to or from such a payment terminal can require a second two wire connection and cannot be concurrently transmitted over the same physical wiring used for current payment commands and fueling commands because the payment terminal and the fuel controller are from two different vendors. Alternatively, data to or from such a payment terminal can require a TCP/IP connection and cannot be concurrently transmitted over the same physical wiring used for current payment commands and fueling commands. Therefore, to allow for the payment data from the payment terminal and the fuel controller to be transmitted simultaneously, additional wires would need to be installed. Because these wires are underground, the installation of additional wires can be expensive and time-consuming. Accordingly, there remains a need for methods and devices for improving fuel dispenser wired communications.

SUMMARY

In general, fuel dispenser wired communication is provided.

In one aspect, a processing system is provided and includes a forecourt signal combiner configured to receive forecourt payment command signals and forecourt fuel controller signals from a forecourt controller, and to combine and compress the forecourt payment command signals and forecourt fuel controller signals to form forecourt compressed data. The system further includes a fuel dispenser signal combiner configured to receive fuel dispenser payment command signals from a payment terminal in a fuel dispenser and fuel dispenser fuel controller signals from a fuel controller in a fuel dispenser, and to combine and compress the received fuel dispenser payment command signals and fuel dispenser fuel controller signals to form fuel dispenser compressed data. The forecourt signal combiner can be configured to transmit the forecourt compressed data to the fuel dispenser signal combiner, and to receive the fuel dispenser compressed data transmitted by the fuel dispenser signal combiner. The fuel dispenser signal combiner can be configured to transmit the fuel dispenser compressed data to the forecourt signal combiner, and to receive the forecourt compressed data transmitted by the forecourt signal combiner.

In certain aspects, the system can also include a fuel controller translator configured to perform operations including, for example, receiving a fuel command having a first format, translating the fuel command from the first format to a second format, and transmitting the fuel command in the second format. In one embodiment, the fuel controller translator is connected in series between the forecourt signal combiner and the fuel dispenser signal combiner. In another embodiment, the forecourt signal combiner includes the fuel controller translator. In other aspects, the forecourt signal combiner and the fuel dispenser signal combiner are in communication over two data channels.

The system can include other components such as a server configured to be in communication with a client. The server and the client can be configured to provide a TCP/IP connection between the forecourt controller and the fuel dispenser. In one embodiment, the server and the client are connected in series between the forecourt signal combiner and the fuel dispenser signal combiner and the communication between the server and the client can use the same data channels as the data signal.

Communication methods for a fuel dispenser are also provided, and in one embodiment the method includes, at a fuel dispenser, receiving a compressed data signal from an external source over first and second wires. The method further includes, at the fuel dispenser, decompressing the compressed data signal into a payment command for processing a payment for fuel and a fuel command for controlling dispensing of fuel from the fuel dispenser. The method can also include causing a payment terminal at the fuel dispenser to execute the payment command, and causing a fuel controller at the fuel dispenser to execute the fuel command.

In one embodiment, causing the payment terminal at the fuel dispenser to execute the payment command comprises transmitting the payment command over third and fourth wires, and causing the fuel controller at the fuel dispenser to execute the fuel command comprises transmitting the fuel command over fifth and sixth wires.

In other aspects, the method can include, at the fuel dispenser, receiving a payment command for processing a payment for fuel and a fuel command for controlling dispensing of fuel from the fuel dispenser, and compressing the payment command and fuel command to form a second compressed data signal, and transmitting the second compressed data signal over the first and second wires. In one aspect, a signal combiner at the fuel dispenser can decompress the compressed data signal.

In other embodiments, the external source can include a forecourt controller, and the compressed data signal is transmitted to the fuel dispenser by a signal combiner coupled between the forecourt controller and the fuel dispenser. The signal combiner coupled between the forecourt controller and the fuel dispenser can receive a payment command and a fuel command from the forecourt controller, and it can compress the payment command and fuel command to create the compressed data signal that is received at the fuel dispenser.

Methods for modifying a fuel dispenser are also provided and in one embodiment the method includes installing a forecourt signal combiner such that the forecourt signal combiner is coupled to a forecourt controller by a first pair of wires for receiving forecourt payment data and by a second pair of wires for receiving forecourt fuel command data, and such that the forecourt signal combiner is coupled to a first end of two underground wires. The method further includes installing a fuel dispenser signal combiner in a fuel dispenser such that the fuel dispenser signal combiner is coupled to a second end of the two underground wires, and the fuel dispenser signal combiner is coupled to a payment terminal in a fuel dispenser by a third pair of wires for receiving fuel dispenser payment data and is coupled to a fuel controller in the fuel dispenser by a fourth pair of wires for receiving fuel dispenser fuel controller data. The forecourt signal combiner can be configured to compress the forecourt payment data and the forecourt fuel command data for transmission through the two underground wires to the fuel dispenser signal combiner. The fuel dispenser signal combiner can be configured to compress the fuel dispenser payment data and the fuel dispenser fuel controller data for transmission through the two underground wires to the forecourt signal combiner.

In one embodiment, the forecourt signal combiner can be configured to decompress the compressed data received from the fuel dispenser signal combiner, and the fuel dispenser signal combiner can be configured to decompress the compressed data received from the forecourt signal combiner.

Embodiments of fuel dispensers are also provided and in one embodiment the fuel dispenser includes a housing having a pump compartment with fuel dispensing components disposed therein an electronics compartment, and a fuel controller disposed within the pump compartment and configured to control dispensing of fuel by the fuel dispensing components. The housing further includes an electronics compartment including a payment terminal configured to process payment for fuel dispensed by the fuel dispensing components. The electronics compartment can also include a signal combiner coupled to the fuel controller and to the payment terminal and configured to receive fuel command data from the fuel controller and to receive payment command data from the payment terminal. The signal combiner can be configured to compress the fuel command data and the payment command data and to transmit the compressed data to an external forecourt controller.

In one embodiment, the signal combiner is coupled to the fuel controller by a first pair of wires and is coupled to the payment terminal by a second pair of wires, and the signal combiner is configured to transmit the compressed data through a third pair of wires.

In other aspects, the payment terminal can be configured to process EMV payments, and the payment command includes an instruction for processing an EMV payment.

Non-transitory computer program products (e.g., physically embodied computer program products) are provided that store instructions, which when executed by one or more data processors of one or more computing systems, causes at least one data processor to perform operations herein. Similarly, computer systems are also provided that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

BRIEF DESCRIPTION OF DRAWINGS

This invention will be more fully understood from the following detailed description taken in conjunction with the accompanying drawings, in which.

DETAILED DESCRIPTION

Figure 1:
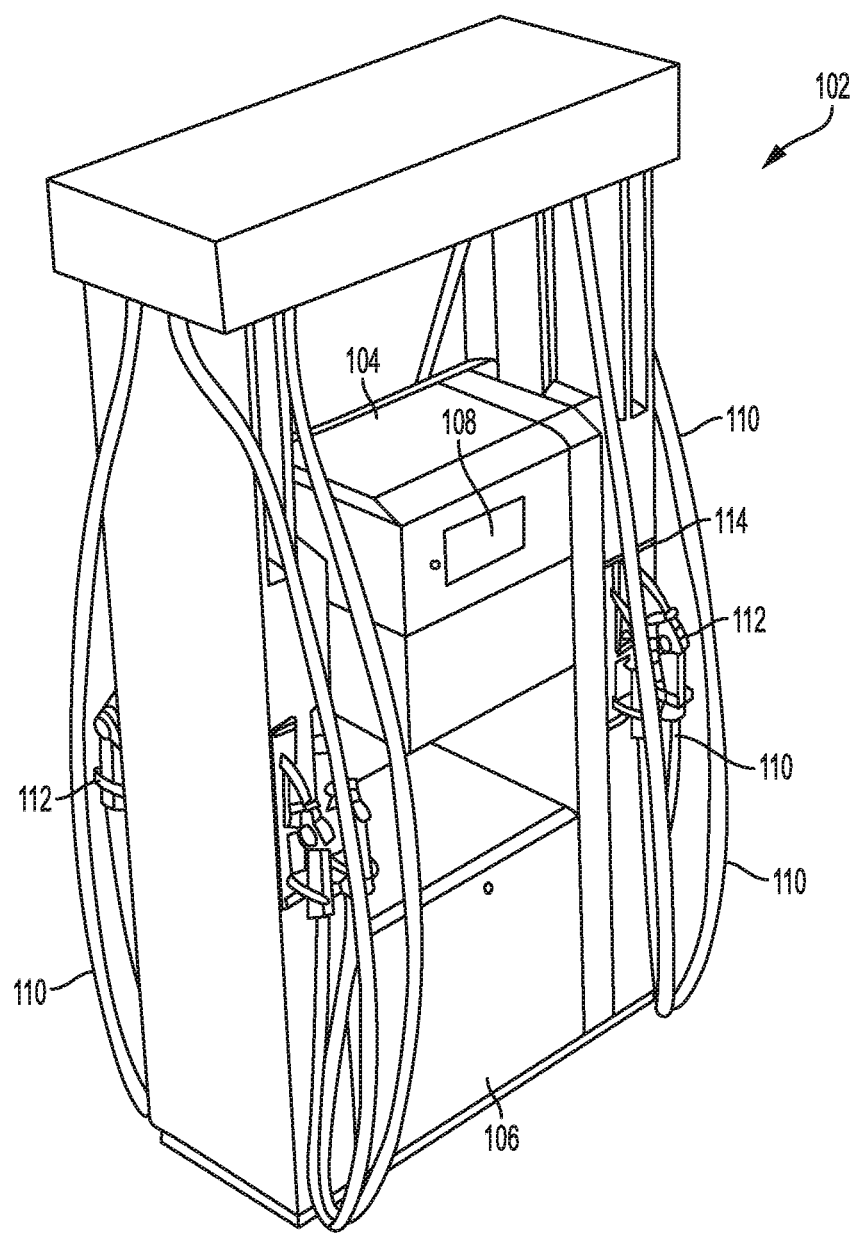
FIG. 1 is a diagram illustrating one embodiment of a fuel dispenser.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

As used herein, the term "signal combiner" can include any computer component that is configured to combine and compress signals, as well as to decompress signals. The operations can be carried out over any number of physical devices. For example, a signal combiner can receive data signals over a number of data channel and combine them for transmission over other data channels. Another signal combiner can receive the data signals, separate them into a larger number (or the original number) of data signals and transmit those data signals to other components. This can also include generally combining or sequencing data signals for sequential or concurrent transmission across other data channels, and the reverse of same.

As used herein, "compressed data" or "compression" can include any combination of combining data signals or commands in an arrangement by which they can be transmitted over a given number of data channels. For example, a compressing operation can compress N input signals into a sequence by which they can be transmitted over M data channels; $N<M$. Similarly, "decompression" can include separating P input signals into a sequence by which they can be transmitted over Q data channels; $Q>P$.

As used herein, the term "data channels" can include any combination of wires, coaxial cables, fiber-optic cables, ribbon cables, or the like.

Also as used herein, the terms "data signals" and "commands" can be used interchangeably to be not only commands that describe or directly cause a specific hardware or software operation, but can also include any type of data which may or may not be used to cause or initiate a hardware or software operation. Examples of commands that may directly cause an operation can be: initiate the dispensing of fuel, display a value on a visual display, terminate the dispensing of fuel, adjust a flow rate for a fuel pump, etc. Examples of commands that may not directly cause an operation can be: specify an amount of fuel to be pumped, query or receive an open/closed status of a pump or valve, a time or timestamp, etc. Thus the term "commands" can refer to any amount or type of data transmitted between the systems described herein.

To enable operation of a fuel dispenser, fueling and payment data signals can be transmitted between a forecourt controller and the fuel dispenser. In some cases, the systems at the forecourt controller and the fuel dispenser may require more data channels than are available between the forecourt controller and the fuel dispenser. In some implementations, one solution can be to combine the data signals such that they can be transmitted over the available data channels. Once transmitted, the data signals can be decompressed at the forecourt controller or the fuel dispenser. In some implementations, as described in further detail herein, the combining can be performed by one or more signal combiners at the forecourt controller and the fuel dispenser.

FIG. 1 is a diagram illustrating one embodiment of a fuel dispenser 102. The fuel dispenser 102 includes an electronics compartment 104 and a pump compartment 106. The electronics compartment 104 has therein electronics for facilitating payment for fuel and for facilitating the dispensing of the fuel. The electronics include, for example, a fuel controller configured to control dispensing of the fuel from the pump compartment, a communication unit configured to electronically communicate wired and/or wirelessly, a display 108 configured to show information (e.g., media content, payment information, etc.) thereon, a memory configured to store data therein, and a payment terminal (e.g., a card reader, etc.) configured to process customer payment. Only the display 108 is shown in FIG. 1. Similar components can be located on the other side of the electronics compartment 104. The fuel dispenser 102 can be configured for mobile payment instead of or in addition to payment through the payment terminal and hence need not include the payment terminal.

The pump compartment 106 has therein a pump configured to pump fuel from a fuel tank or other reservoir and has therein a fuel meter configured to monitor fuel flow. The pump compartment 106 can include other elements to facilitate fuel dispensing, such as valves, a vapor recovery system, etc. The pump compartment 106 is isolated from the electronics compartment 104 within the fuel dispenser 102 to facilitate safety, security, and/or maintenance, as will be appreciated by a person skilled in the art. Fuel is thus not allowed to flow from the pump compartment 106 to the electronics compartment 104 and instead flows from the pump compartment 106 through hoses 110 to nozzles 112 for dispensing. As will be appreciated by a person skilled in the art, the nozzles 112 are each configured to dispense fuel from the fuel dispenser 102 as pumped therefrom by the pump.

The fuel dispenser 102 is configured to be connected to the fuel tank or other reservoir containing fuel. When filling up the tank of a motor vehicle, the fuel is pumped from the tank or reservoir by the pump located in the pump compartment 106 and to a nozzle 112 via a fuel pipe (not shown) and a fuel hose 110. When each fuel hose 110 is not in use, the fuel hose 110 hangs along the fuel dispenser 102, and its associated nozzle 112 is seated in a nozzle boot 114. The illustrated fuel dispenser 102 includes four hoses 110 and four nozzles 112 on one side of the dispenser 102 and four hoses 110 and four nozzles 112 on the other side of the dispenser 102, but as will be appreciated by a person skilled in the art, the fuel dispenser 102 can include any number of hoses 110 and nozzles 112. A person skilled in the art will also appreciate that the fuel dispenser 102 can have various other configurations.

Figure 2:
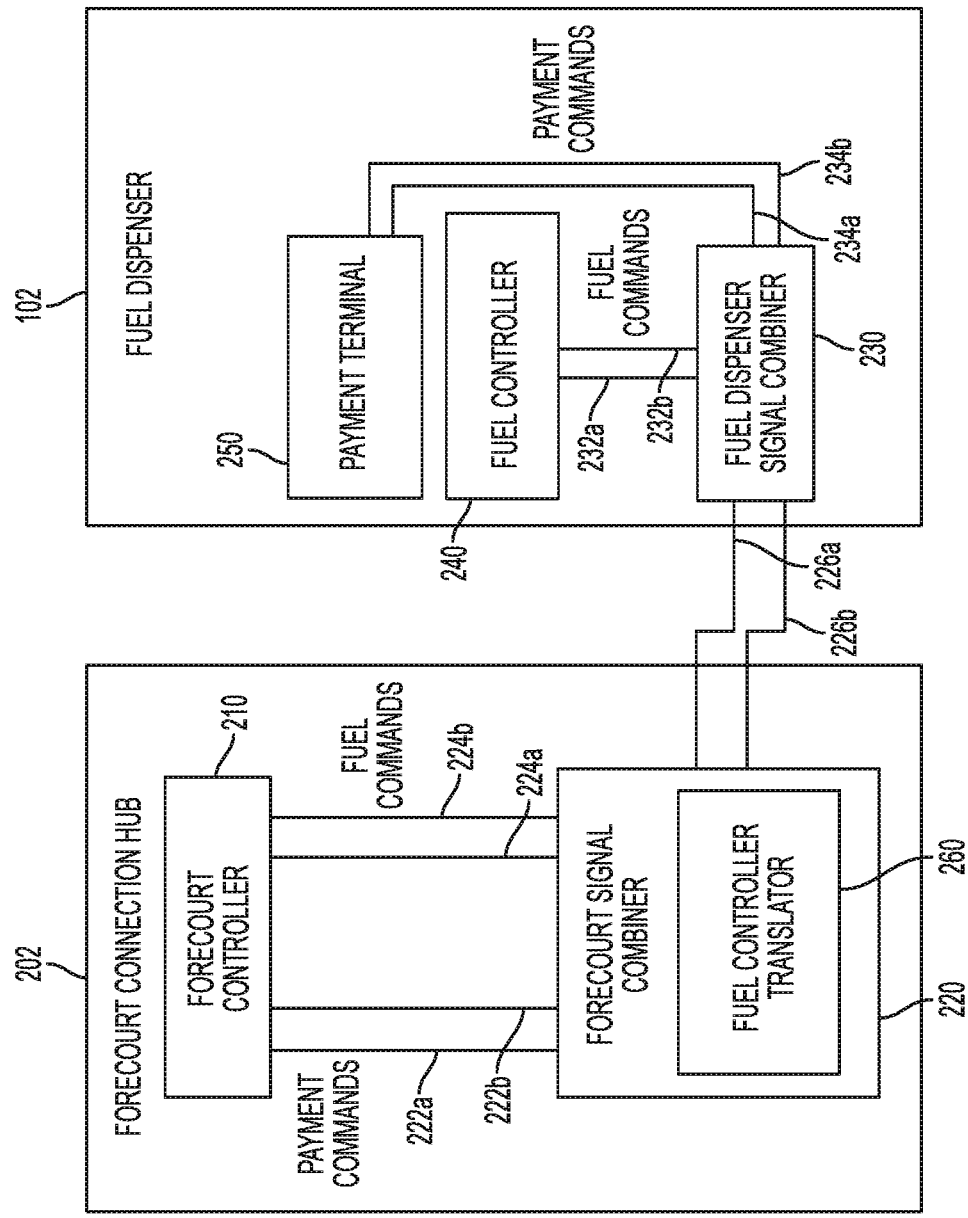
FIG. 2 is a system diagram illustrating two signal combiners enabling communication between a forecourt controller and a fuel dispenser in accordance with certain aspects of the present disclosure.

FIG. 2 is a system diagram illustrating two signal combiners that enable communication between a forecourt controller 210 and the fuel dispenser 102. In some implementations, a fueling establishment can include a forecourt controller 210 located in a forecourt connection hub 202. The forecourt connection hub 202 can be an area located in or around a building, such as a store. The forecourt can include any area between the forecourt controller 210 and a fuel dispenser 102. For example, the forecourt can be where motorists bring their vehicles to be fueled, an intervening building area, or the like. The forecourt controller 210 can act to receive payment information, e.g., from a point-of-sale terminal, such as a cash register, as well as to monitor fuel dispensers, control fuel dispenser operation, or the like. The forecourt controller 210 can also send and receive commands to and from the fuel dispenser 102.

Figure 3:
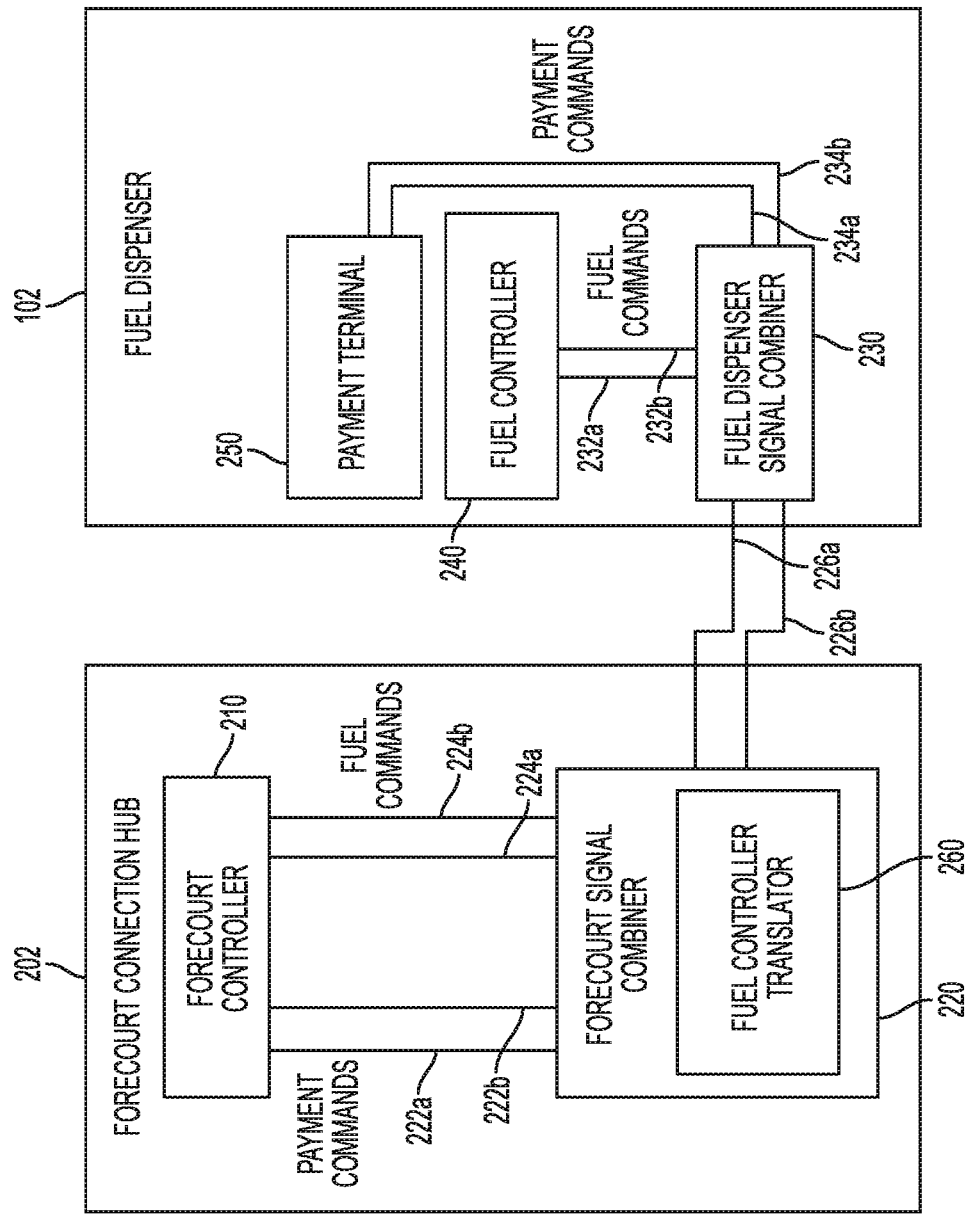
FIG. 3 is a system diagram illustrating the system of FIG. 2 having a fuel controller translator included therein.
Figure 4:
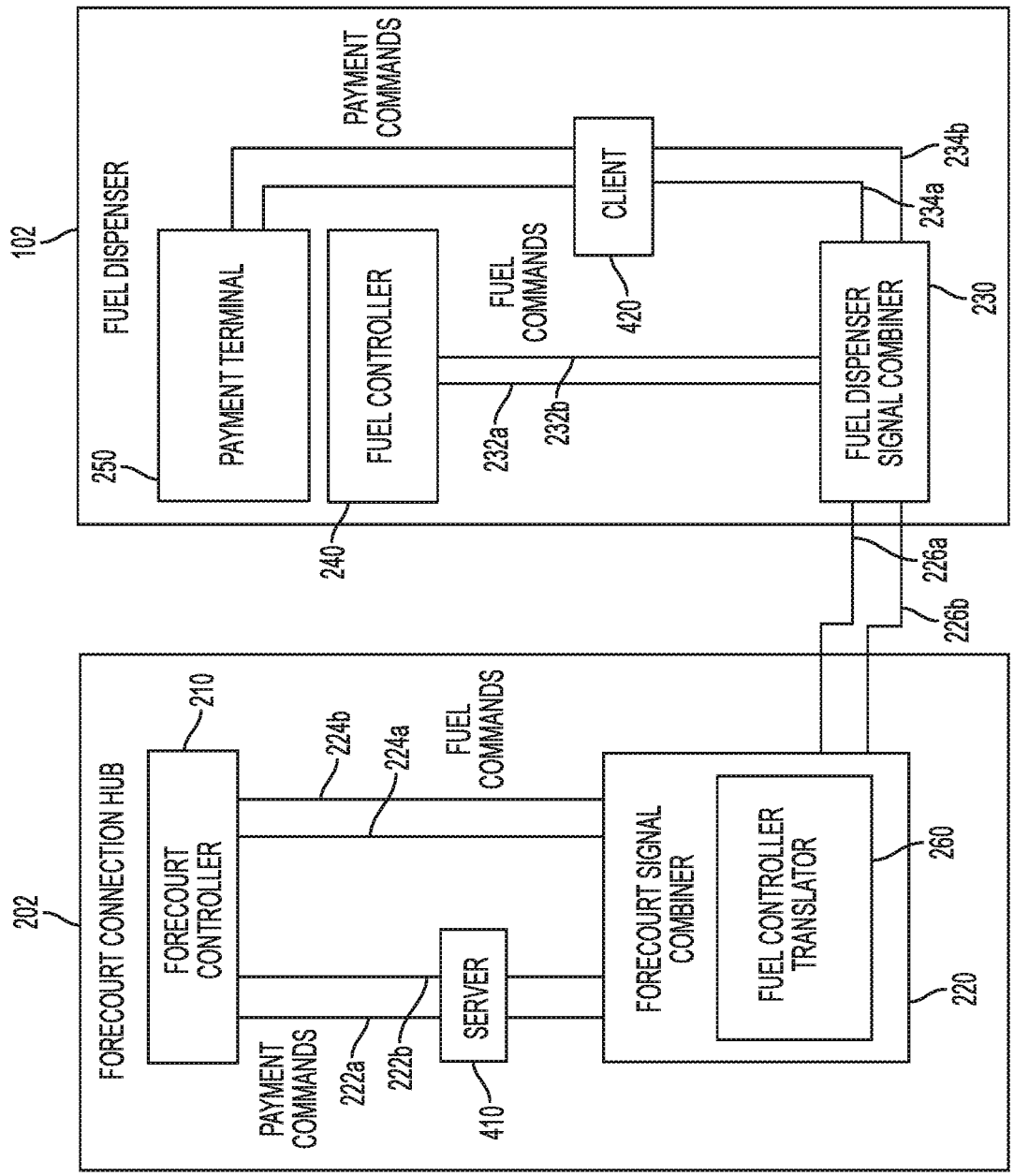
FIG. 4 is a system diagram illustrating a server and a client between the forecourt signal combiner and the fuel dispenser signal combiner in accordance with certain aspects of the present disclosure.

In some cases there can be a lower number of available data channels, wires, or the like, between the forecourt connection hub 202 and the fuel dispenser 102 than may be required by the forecourt controller 210 and/or by the fuel dispenser 102 to transfer both payment commands and fuel commands. In FIGS. 2-4, a first pair of underground data channels 226a, 226b are coupled between the forecourt controller 210 and the fuel dispenser 102 for carrying commands therebetween. Each data channel 226a, 226b can include one or more physical channels, wires, cables, or the like.

In one implementation, the forecourt controller 210 and/or the fuel dispenser 102 may require more than two underground data channels extending across the forecourt. For example, modification of a dispenser to include or upgrade a payment terminal in the electronics compartment may require additional data channels than are currently present. In such a configuration, a forecourt signal combiner 220 can be installed in the forecourt connection hub and coupled between the forecourt controller 210 and the fuel dispenser 102, and/or a fuel dispenser signal combiner 230 can be installed in the fuel dispenser 102 and coupled between various components of the fuel dispenser 102 and the forecourt signal combiner 202.

In another implementation, the forecourt signal combiner can be configured to process (either for transmitting or receiving) command signals in multiple formats. One example of this can be where the forecourt payment command signals are in one two-wire format (i.e. RS485) and the forecourt fuel controller signals are in a different two-wire format (i.e. USCL).

Similarly, in another implementation, the fuel dispenser signal combiner can be configured to process (either for transmitting or receiving) command signals in multiple formats. One example of this can be where the fuel dispenser payment command signals are in one two-wire format (i.e. RS485) and the fuel dispenser fuel controller signals are in a different two-wire format (i.e. CANBus).

Commands from the forecourt controller 210 can be transmitted to the forecourt signal combiner 220 and compressed into a data signal for transmission over a reduced number of channels, e.g., the two underground data channels 226a, 226b, to the fuel dispenser signal combiner 230 at the fuel dispenser 102. The forecourt controller commands can include forecourt payment commands that are transmitted to the forecourt signal combiner 220 across a second pair of data channels 222a, 222b, and forecourt fuel commands that are transmitted to the forecourt signal combiner 210 across a third pair of data channels 224a, 224b. Thus four wires 222a, 222b, 224a, 224b can be coupled between the forecourt controller 210 and the forecourt signal combiner 220, and the four wire data can be compressed for transmission across the two underground wires 226a, 226b.

The fuel dispenser signal combiner 230 can then process the compressed data signal received from the forecourt signal combiner 220 via the two underground wires 226a, 226b to separate or decompress the received commands and distribute them across any number of output channels to components in the fuel dispenser 102. These components can include, for example, a fuel controller 240 and a payment terminal 250. For example, compressed data can be decompressed into payment commands that are transmitted to the payment terminal 250 and fuel commands that are transmitted to the fuel controller 240. The fuel commands can be transmitted to the fuel controller 240 through a fourth pair of data channels 232a, 232b, and the payment commands can be transmitted to the payment terminal 250 through a fifth pair of data channels 234a, 234b. The commands can cause the payment terminal 250 at the fuel dispenser 102 to execute the payment commands and the fuel controller 240 at the fuel dispenser to execute the fuel commands.

Conversely, the commands from the fuel controller 240 and payment terminal 250 can be combined and compressed by the fuel dispenser signal combiner 230 into a data signal for transmission over a reduced number of channels, e.g., the first pair of data channels 226a, 226b, to the forecourt signal combiner 220 in the forecourt connection hub 202. The forecourt signal combiner 220 can then process the data signal to separate or decompress the received commands and distribute them across any number of output channels to the forecourt controller 210. For example, the decompressed signal can include payment commands that are transmitted to the forecourt controller 210 across the second pair of data channels 222a, 222b, and fuel commands that are transmitted to the forecourt controller 210 across the third pair of data channels 224a, 224b.

Each signal combiner 220, 230 can compress the data, for example, using frequency-division multiplexing, time-division multiplexing, polarization-division multiplexing, code-division multiplexing, or the like, when configured to do so.

Accordingly, the above processes can be performed bi-directionally. Payment commands can be sent from the payment terminal 250, through the fuel dispenser signal combiner 230, to the forecourt signal combiner 220 and then ultimately to the forecourt controller 210. Similarly, commands or responses from the fuel controller 240 can be transmitted through the fuel dispenser signal combiner 230 and the forecourt signal combiner 220 to the forecourt controller 210. Conversely, payment commands and fuel commands from the forecourt controller 210 can be sent through the forecourt signal combiner 220 to the fuel dispenser signal combiner 230 and ultimately to the fuel controller 240 and payment terminal 250.

In some implementations, as shown in FIG. 3, commands can be translated from a first format to a second format, and vice versa, by a fuel controller translator 260. For example, the fuel controller translator 260 can receive a fuel command in a first format. The fuel command can be translated from a first format to a second format. Then, the translated fuel command, in the second format, can be transmitted to the forecourt controller 210, the fuel dispenser signal combiner 230, or other component.

In one implementation, a fuel controller translator 260 can be included on the forecourt controller side of the system, or otherwise external to the fuel dispenser 102. In some implementations, this can include the fuel controller translator 260 being connected in series between the forecourt signal combiner 220 and the fuel dispenser signal combiner 230. In other implementations, the fuel controller translator 260 can be incorporated into the fuel dispenser 102 or into any components of the fuel dispenser 102. In yet another implementation, as shown in FIG. 3, the fuel controller translator 260 can be integrated into a circuit board in the forecourt signal combiner 220. Details of one implementation of the fuel controller translator 260 are described in U.S. patent application Ser. No. 15/206,951, titled "Fuel Controller Translator," filed on even date herewith, the contents of which are incorporated by reference.

FIG. 4 is a system diagram illustrating a server 410 and a client 420 between the forecourt signal combiner 220 and the fuel dispenser signal combiner 230, in accordance with certain aspects of the present disclosure. Additional types of data can also be routed through the system. For example, there can be a server located at the forecourt connection hub 102 and a client located at the fuel dispenser 102. The server and the client can be connected computers that encode and transmit particular types of data over the same data channels between the signal combiners, and hence between the forecourt connection hub 202 and the fuel dispenser 102. The server and client can enable, for example, TCP/IP connectivity, which may be required for some components or operations, such as complying with the EMV standard. The payment terminal 250 can be configured to process these EMV payments, where the payment command can include an instruction for processing an EMV payment. The payment commands can go through the server 410 and client 420 where they can be transmitted in a TCP/IP protocol across the same data channels as the fueling commands. In some implementations, as shown in FIG. 4, the server and the client can be connected in series between the forecourt signal combiner 220 and the fuel dispenser signal combiner 230.

Figure 5:
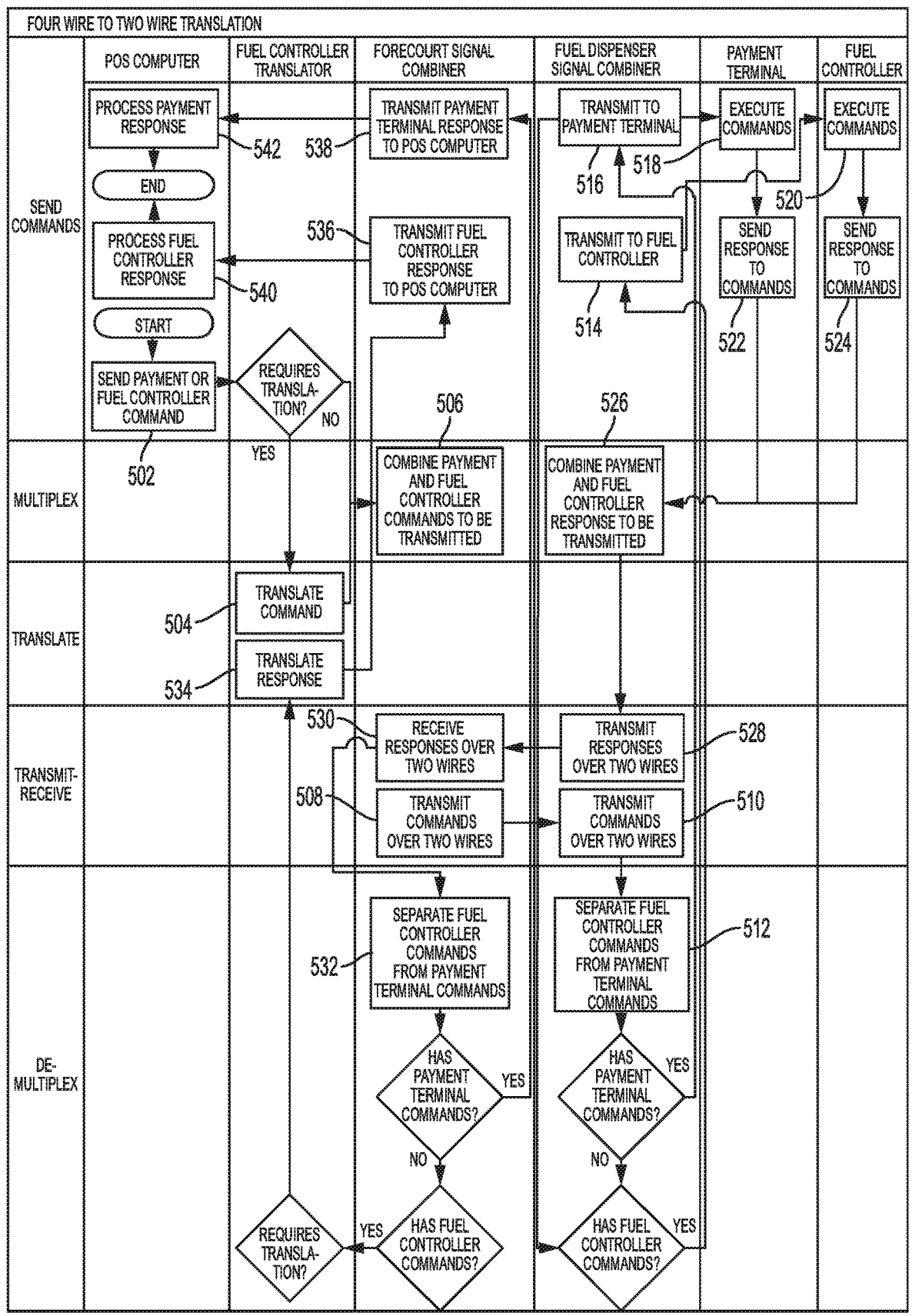
FIG. 5 is a process flow diagram illustrating a method in accordance with certain aspects of the present disclosure.

FIG. 5 is a process flow diagram illustrating a method in accordance with certain aspects of the present disclosure. The process flow diagram is shown in reference to FIG. 3, where the fuel controller translator 260 is incorporated with the forecourt signal combiner 220.

At 502 the forecourt signal combiner 220 can send payment or fuel controller commands to the fuel controller translator 260.

At 504 the fuel controller translator 260 can translate any commands that require translation from the first format to the second format.

At 506 the forecourt signal combiner 220 can combine the payment and fuel controller commands for transmission.

At 508 the forecourt signal combiner 220 can transmit the commands over two wires.

At 510 the fuel dispenser signal combiner 230 can receive the commands over the two wires.

At 512 the fuel dispenser signal combiner 230 can separate the fuel controller commands from the payment terminal commands.

At 514 the fuel dispenser signal combiner 230 can transmit fuel controller commands to the fuel controller 240.

At 516 the fuel dispenser signal combiner 230 can transmit payment terminal commands to the payment terminal 250.

At 518 the payment terminal 250 can execute the payment terminal commands.

At 520 the fuel controller 240 can execute the fuel controller commands.

At 522 the payment terminal 250 can send a response to payment terminal commands.

At 524 the fuel controller 240 can send a response to fuel controller commands.

At 526 the fuel dispenser signal combiner 230 can combine the responses from the payment terminal 250 and the fuel controller 240.

At 528 the fuel dispenser signal combiner 230 can transmit the responses over the two wires.

At 530 the forecourt signal combiner 220 can receive the response over the two wires.

At 532 the forecourt signal combiner 220 can separate the fuel controller commands from the payment terminal commands.

At 534 the fuel controller translator 260 can translate the responses.

At 536 forecourt signal combiner 220 can transmit the response from the fuel controller 240 to the POS computer.

At 538 the forecourt signal combiner 220 can transmit the response from the payment terminal 250 to the POS computer.

At 540 the POS computer can process the fuel controller response.

At 542 the POS computer can process the payment terminal response.

Figure 6:
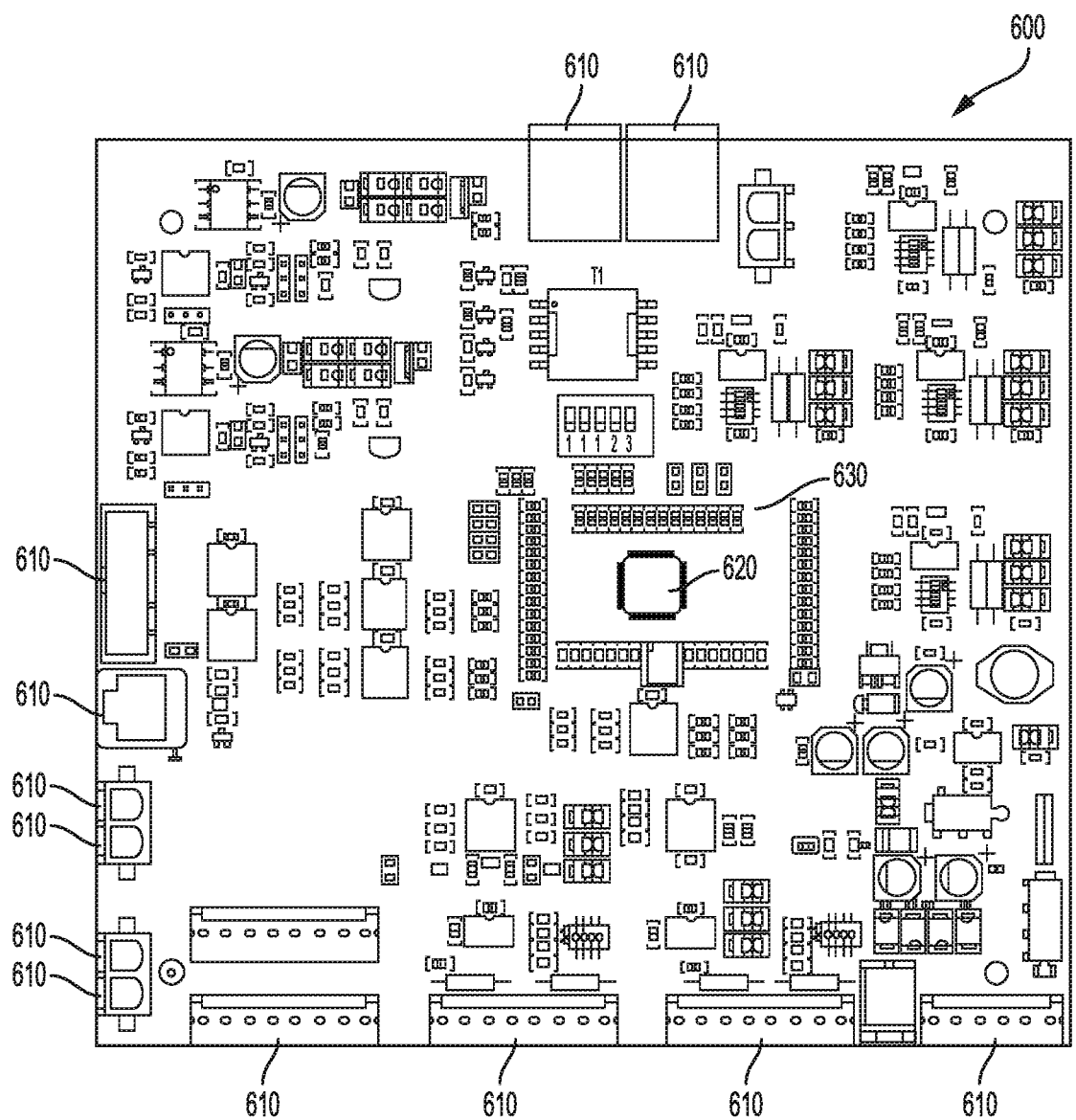
FIG. 6 is a top view of one exemplary embodiment of a signal combiner in accordance with certain aspects of the present disclosure.

FIG. 6 is a diagram of an exemplary signal combiner 600 in accordance with certain aspects of the present disclosure. The forecourt signal combiner 220 or the fuel dispenser signal combiner 230 can have, for example, the configuration shown in FIG. 6. The signal combiner 600 can have input/output connectors 610, which have different connectors based on the type of connection being made. There can also be a chip 620 in which a fuel controller translator 260 can be loaded. In the specific example of the signal combiner 600 shown in FIG. 6, dip switches 630 can be set to indicate which signals are being combined to which input/output connectors 610 going out of the signal combiner 600.

A signal combiner 600 in the forecourt connection hub 202 can be mounted anywhere. This signal combiner 600 can be wired to various components within the forecourt connection hub 202. Similarly, a signal combiner 600 in the fuel dispenser 102 can be mounted in the electronics compartment 104 (FIG. 1). This signal combiner 600 can be wired to the fuel controller 240 and to the payment terminal 250. Output connectors 610 of the two signal combiners can be wired together by the first pair of wires 226a, 226b.

Figure 7:
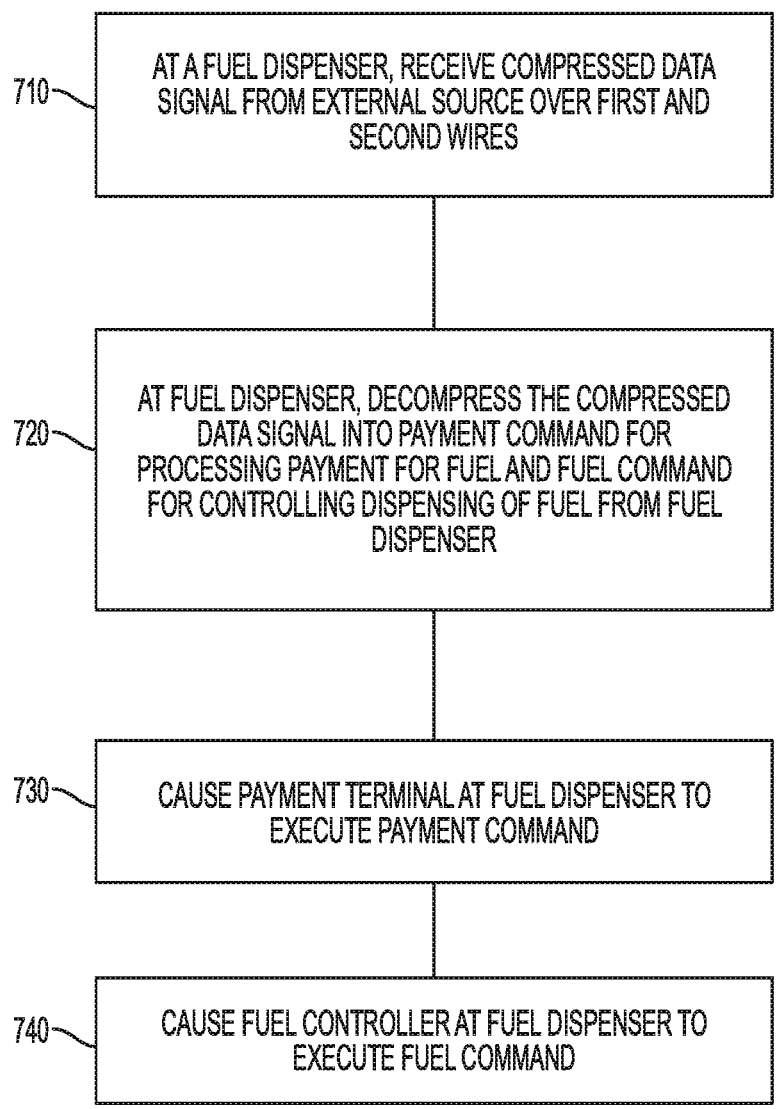
FIG. 7 is a process flow diagram illustrating another method in accordance with certain aspects of the present disclosure.

FIG. 7 is a process flow diagram illustrating another method in accordance with certain aspects of the present disclosure.

At 710, a fuel dispenser 102 can receive a compressed data signal from an external source over first and second wires.

At 720, the fuel dispenser 102 can decompress the compressed data signal into a payment command for processing a payment for fuel and a fuel command for controlling dispensing of fuel from the fuel dispenser 102.

At 730, the payment terminal 250 at the fuel dispenser 102 can be caused to execute the payment command.

At 740, the fuel controller 240 at the fuel dispenser 102 can be caused to execute the fuel command.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A processing system comprising:
a forecourt signal combiner connected to a forecourt controller by a first pair of wires and a second pair of wires, the forecourt signal combiner configured to receive forecourt payment command signals from the forecourt controller via the first pair of wires and forecourt fuel controller signals from the forecourt controller via the second pair of wires, and to combine and compress the forecourt payment command signals and forecourt fuel controller signals to form forecourt compressed data;
a fuel dispenser signal combiner connected to a payment terminal in a fuel dispenser by a third pair of wires and to a fuel controller in the fuel dispenser by a fourth pair of wires, the fuel dispenser signal combiner configured to receive fuel dispenser payment command signals from the payment terminal via the third pair of wires and fuel dispenser fuel controller signals from the fuel controller via the fourth pair of wires, and to combine and compress the received fuel dispenser payment command signals and fuel dispenser fuel controller signals to form fuel dispenser compressed data, the third pair of wires being dedicated for transmission of the fuel dispenser payment command signals;
wherein the forecourt signal combiner is configured to transmit the forecourt compressed data to the fuel dispenser signal combiner, and to receive the fuel dispenser compressed data transmitted by the fuel dispenser signal combiner; and
wherein the fuel dispenser signal combiner is configured to transmit the fuel dispenser compressed data to the forecourt signal combiner, and to receive the forecourt compressed data transmitted by the forecourt signal combiner.

2. The processing system of claim 1, wherein the forecourt signal combiner is configured to decompress the compressed data received from the fuel dispenser signal combiner, and the fuel dispenser signal combiner is configured to decompress the compressed data received from the forecourt signal combiner.

3. The processing system of claim 1, further comprising a fuel controller translator configured to perform operations comprising:
receiving a fuel command having a first format;
translating the fuel command from the first format to a second format; and
transmitting the fuel command in the second format.

4. The processing system of claim 3, wherein the fuel controller translator is connected in series between the forecourt signal combiner and the fuel dispenser signal combiner.

5. The processing system of claim 3, wherein the forecourt signal combiner includes the fuel controller translator.

6. The processing system of claim 3, wherein the forecourt signal combiner and the fuel dispenser signal combiner are in communication over two data channels.

7. The processing system of claim 1, further comprising:
a server configured to be in communication with a client, wherein the server and the client are configured to provide a TCP/IP connection between the forecourt controller and the fuel dispenser.

8. The processing system of claim 7, wherein the server and the client are connected in series between the forecourt signal combiner and the fuel dispenser signal combiner and wherein the communication between the server and the client use the same data channels as the data signal.

9. The processing system of claim 1, wherein the third pair of wires is not coupled to the fuel controller and is thus prevented from transmitting any fuel dispenser fuel controller signals to the fuel controller, and the fourth pair of wires is not coupled to the payment terminal and is thus prevented from transmitting any payment command signals to the payment terminal.

10. A communication method for a fuel dispenser, comprising:
at a fuel dispenser, receiving a compressed data signal from an external source over first and second wires;
at the fuel dispenser, decompressing the compressed data signal into a payment command for processing a payment for fuel and a fuel command for controlling dispensing of fuel from the fuel dispenser;
transmitting the payment command via third and fourth wires to a payment terminal at the fuel dispenser so as to cause the payment terminal to execute the payment command, the third and fourth wires being dedicated for transmission of the payment command; and
transmitting the fuel command via fifth and sixth wires to a fuel controller at the fuel dispenser so as to cause the fuel controller to execute the fuel command.

11. The method of claim 10, further comprising, at the fuel dispenser, receiving a payment command for processing a payment for fuel and a fuel command for controlling dispensing of fuel from the fuel dispenser, and compressing the payment command and fuel command to form a second compressed data signal, and transmitting the second compressed data signal over the first and second wires.

12. The method of claim 10, wherein a signal combiner at the fuel dispenser decompresses the compressed data signal.

13. The method of claim 10, wherein the external source includes a forecourt controller, and the compressed data signal is transmitted to the fuel dispenser by a signal combiner coupled between the forecourt controller and the fuel dispenser.

14. The method of claim 13, wherein the signal combiner coupled between the forecourt controller and the fuel dispenser receives a payment command and a fuel command from the forecourt controller, and compresses the payment command and fuel command to create the compressed data signal that is received at the fuel dispenser.

15. The method of claim 10, wherein the third and fourth wires are not coupled to the fuel controller and are thus unable to carry any signals to the fuel controller, and the fifth and sixth wires are not coupled to the payment terminal and are thus unable to carry any signals to the payment terminal.

16. A method for modifying a fuel dispenser, comprising:
installing a forecourt signal combiner such that the forecourt signal combiner is coupled to a forecourt controller by a first pair of wires for receiving forecourt payment data and by a second pair of wires for receiving forecourt fuel command data, and such that the forecourt signal combiner is coupled to a first end of two underground wires; and
installing a fuel dispenser signal combiner in a fuel dispenser such that the fuel dispenser signal combiner is coupled to a second end of the two underground wires, and the fuel dispenser signal combiner is coupled to a payment terminal in a fuel dispenser by a third pair of wires for receiving fuel dispenser payment data and is coupled to a fuel controller in the fuel dispenser by a fourth pair of wires for receiving fuel dispenser fuel controller data, the third pair of wires not being coupled to the fuel controller and thus being unable to transmit the fuel dispenser fuel controller data, and the fourth pair of wires not being coupled to the payment terminal and thus being unable to transmit the fuel dispenser payment data;
wherein the forecourt signal combiner is configured to compress the forecourt payment data and the forecourt fuel command data for transmission through the two underground wires to the fuel dispenser signal combiner; and
wherein the fuel dispenser signal combiner is configured to compress the fuel dispenser payment data and the fuel dispenser fuel controller data for transmission through the two underground wires to the forecourt signal combiner.

17. The method of claim 16, wherein the forecourt signal combiner is configured to decompress the compressed data received from the fuel dispenser signal combiner, and the fuel dispenser signal combiner is configured to decompress the compressed data received from the forecourt signal combiner.

18. A fuel dispenser, comprising:
a housing comprising:
a pump compartment with fuel dispensing components disposed therein an electronics compartment, and a fuel controller disposed within the pump compartment and configured to control dispensing of fuel by the fuel dispensing components, and
an electronics compartment including a payment terminal configured to process payment for fuel dispensed by the fuel dispensing components, the electronics compartment including a signal combiner coupled to the fuel controller by a first pair of wires and to the payment terminal by a second pair of wires and configured to receive fuel command data from the fuel controller only via the first pair of wires and to receive payment command data from the payment terminal only via the second pair of wires, the signal combiner being configured to compress the fuel command data and the payment command data and to transmit the compressed data to an external forecourt controller.

19. The fuel dispenser of claim 18, wherein the signal combiner is configured to transmit the compressed data through a third pair of wires.

20. The fuel dispenser of claim 18, wherein the payment terminal is configured to process EMV payments, and the payment command includes an instruction for processing an EMV payment.

* * * * *